United States Patent [19]

Maeda et al.

[11] 4,367,851
[45] Jan. 11, 1983

[54] SEAT BELT RETRACTOR WITH A TENSION ELIMINATOR

[75] Inventors: Kouzou Maeda, Yokohama; Ken Kamijo, Yokosuka, both of Japan

[73] Assignee: Nissan Motor Co., Ltd., Yokohama, Japan

[21] Appl. No.: 232,500

[22] Filed: Feb. 9, 1981

[30] Foreign Application Priority Data

Feb. 8, 1980 [JP] Japan .................. 55-14582

[51] Int. Cl.³ .................. A62B 35/02; B65H 75/48
[52] U.S. Cl. .................. 242/107.7; 280/807; 297/475
[58] Field of Search ............. 242/107.7, 107.6, 107.12, 242/107.4 R-107.4 E; 280/806-808, 803; 297/475-478; 180/268-270

[56] References Cited

U.S. PATENT DOCUMENTS

| | | | |
|---|---|---|---|
| 2,708,966 | 5/1955 | Davis | 242/107.4 A |
| 3,635,419 | 1/1972 | Pringle | 242/107.4 C |
| 3,851,836 | 12/1974 | Sprecher | 242/107.7 |
| 3,876,031 | 4/1975 | Stouffer | 242/107.4 R |
| 4,002,311 | 1/1977 | Fisher et al. | 242/107.7 |
| 4,023,746 | 5/1977 | Magyar | 242/107.7 |
| 4,108,395 | 8/1978 | Heath | 242/107.7 |
| 4,109,962 | 8/1978 | Magyar | |
| 4,198,011 | 4/1980 | Kamijo et al. | 242/107.7 |

FOREIGN PATENT DOCUMENTS 2723295 12/1978 Fed. Rep. of Germany .
2250282 5/1975 France .

*Primary Examiner*—John M. Jillions
*Attorney, Agent, or Firm*—James C. Wray

[57] ABSTRACT

A seat belt retractor with a belt tension eliminator comprises a belt take up reel, a retracting spring, means for producing a belt fastening signal, and a tension eliminator which prevents retraction of the belt with a measure of slack in the same, so that the tension or stress exerted on the body of the belt wearer by the belt fastened is eliminated by rendering the force of the retraction spring to be inactive in the normal driving position and posture assumed by the belt wearer.

9 Claims, 12 Drawing Figures

4,367,851

SEAT BELT RETRACTOR WITH A TENSION ELIMINATOR

BACKGROUND OF THE INVENTION

1. Field of the Invention

The present invention relates in general to an automotive seat belt retractor and more particularly to a seat belt retractor having a tension eliminator which eliminates the belt tension applied to the belt wearer's body when the wearer assumes a normally seated position.

2. Description of the Prior Art

A number of proposals have been made to provide seat belt retractors with tension eliminators which will lock the extended belt when the belt assumes the seated occupant retraining position. Some of the belt retractors of the above-mentioned type are designed to complete the locking of the extended belt at the instant that the buckle and the tongue of the seat belt are coupled together for restraining the seated occupant. However, this type retractor sometimes causes a loosed-fastening of the belt in restraining the seated occupant because the coupling of the buckle and the tongue is usually made by withdrawing from the retractor the belt too much. Many attempts to solve such drawback have been taken place, but they fail to obtain sufficient good results in simplicity and economization.

SUMMARY OF THE INVENTION

Therefore, it is an object of the present invention to provide a seat belt retractor with a tension eliminator which is free from the above-mentioned drawback.

According to the present invention, there is provided a seat belt retractor having a tension eliminator. The retractor comprises a belt take up reel on which a seat belt is wound, the reel being biased to rotate in a direction to retract thereon the belt; a belt measuring wheel which is rotatable with the reel about the axis of the reel; slide means movable in response to the rotation of the belt measuring wheel; first signal producing means for producing a signal when the slide means takes a predetermined position; second single producing means for producing a signal when the belt takes an operative position to restrain the seated occupant; blocker means having an operative position for preventing rotation of the reel in the directon to retract the belt in response to receiving both the signals produced by the first and second signal producing means, and an inoperative position allowing free rotation of the reel; stopping means for stopping the rotation of the belt measuring wheel in the same direction as that of the reel to withdraw the belt when the slide means takes the predetermined position and the blocker means takes the inoperative position; and obstruction means for preventing the blocker means from taking the operative position when the belt measuring wheel is in a predetermined angular range.

BRIEF DESCRIPTION OF THE DRAWINGS

Other objects and advantages of the present invention will become clear from the following description when taken in conjunction with the accompanying drawings.

DETAILED DESCRIPTION OF THE INVENTION

Figure 1:
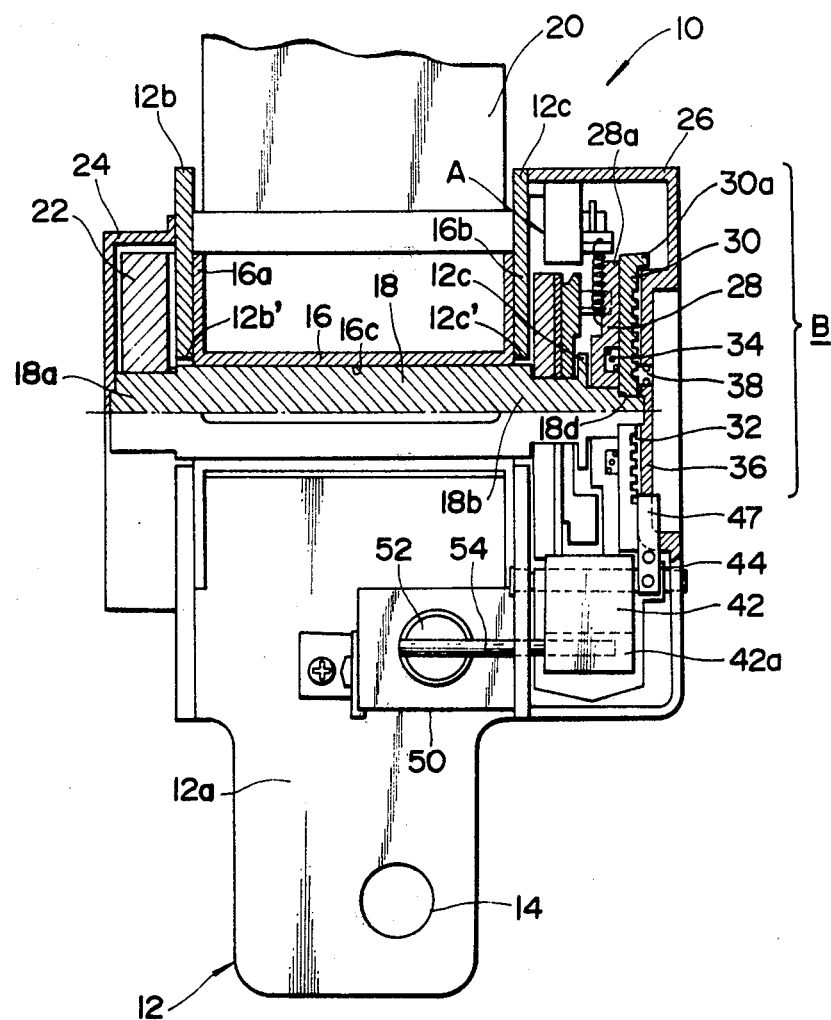
FIG. 1 is a partially sectional front view of a seat belt retractor of the present invention.
Figure 2:
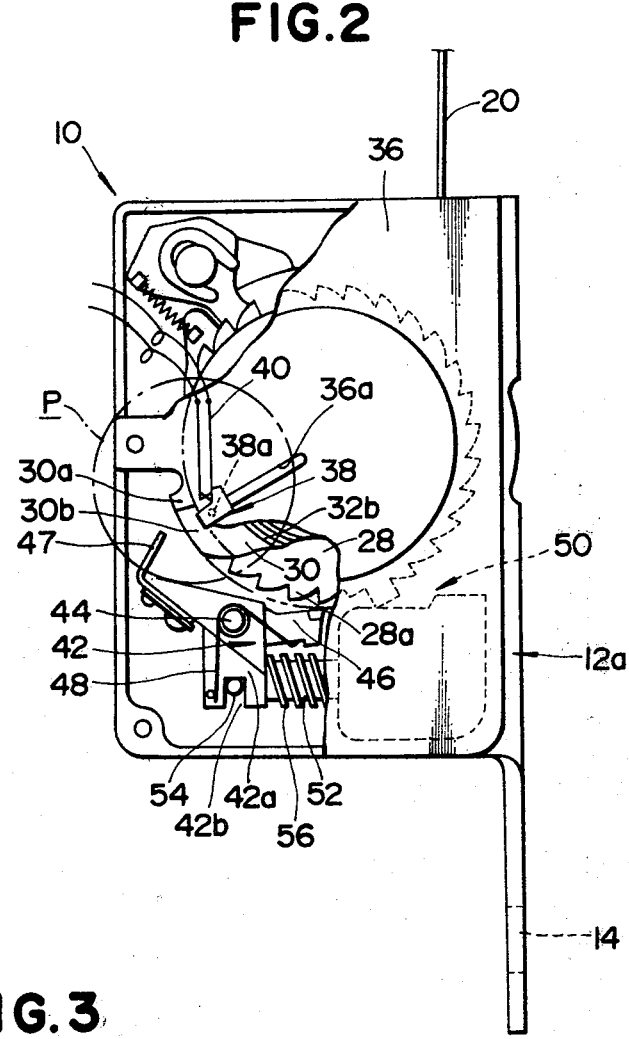
FIG. 2 is a partially sectional side view of the seat belt retractor of the present invention.

Referring to the drawings, particularly FIGS. 1 and 2, there is shown a seat belt retractor 10 of the present invention. The retractor 10 comprises a generally U-shaped housing 12 consisting of a base section 12a and a pair of side wall sections 12b and 12c. The housing 12 is adapted to connect to a suitable body portion or a seat portion of a vehicle by a bolt (not shown) passing through a hole 14 formed in the base section 12a. The wall sections 12b and 12c are formed with aligned holes 12b' and 12c' and receive therebetween a belt take up reel 16 in a manner that the axis of the reel 16 passes the centers of the holes 12b' and 12c'. The reel 16 has on both ends circular flanges 16a and 16b, respectively. An elongate shaft 18 is passed through an axial hole 16c of the reel 16 with the ends 18a and 18b thereof rotatably journaled in the holes 12b' and 12c' of the side wall sections 12b and 12c of the housing 12 so that the reel 16 is rotatably supported in the housing 12. An end of a belt 20 passes through an elongate slit (not shown) formed in the tubular section of the reel 16 and connects to the elongate shaft 18. With this, the reel 16 and the elongate shaft 18 constitute a unit which is rotatable about the axis of the shaft 18 relative to the housing 12 in response to the winding and unwinding of the belt 20 on and off the reel 16. Located outside of the wall section 12b of the housing 12 is a return spring 22 which is held in a cover 24 secured to the wall section 12b. An inner end of the spring 22 is secured to the projected end 18a of the shaft 18 and an outer end of the same is secured to the cover 24 so that the shaft 18 and thus the reel 16 are biased to rotate in a direction to wind thereon the belt 20, that is in a clockwise direction in FIG. 2.

An emergency locking mechanism generally indicated by a symbol A and a tension eliminator assembly indicated by a symbol B are arranged on the other projected end 18b of the elongate shaft 18 in a manner described below. A cover 26, for instance of rectangular shape as seen in FIG. 2, encompasses these assemblies and is fastened to the side wall section 12 of the housing 12. The extreme end of the shaft end portion 18b is journalled to the end wall of the cover 26.

The emergency locking mechanism A may be of any known type which functions to lock the elongate shaft 18 stopping feeding of the belt 20 from the reel 16 when subjected to violent forward movement of the belt wearer as in collision of the vehicle.

The belt tension eliminator B, on the other hand, just pertains to the invention and will be fully explained below: A ratchet wheel 28 is fixedly mounted on the shaft end 18b outside of the emergency locking mechanism A. The latter is separated from the ratched wheel 28 by a radially extending circular flange 12c of the shaft 18, which at the same time prevents axial inward movement of the ratchet wheel 28.

The shaft end portion 18b just outward of the ratchet wheel 28 is stepped down to define an annular shoulder portion 18d. Abutting the annular shoulder 18d is a grooved wheel 30 formed on its surface with a voluted groove 32 for the purpose described hereinafter, which is freely rotatably carried by the shaft end 18b. The wheel 30 is held in frictional contact with the ratchet wheel 28 by means of a helical spring 34 which is accommodated in an annular groove (no numeral) formed in the outer surface of the ratchet wheel 28 and is compressed between the ratchet wheel 28 and the grooved wheel 30. These are thus rotatable almost together unless one of them is locked against rotation by some means.

The aforementioned end wall of the cover 26 is formed with an inwardly raised disc-shaped portion 36 which faces the outer surface of the grooved wheel 30, as is seen from FIG. 1. It would be thus appreciated that the three circular members 28, 30 and 36 are concentrically arranged with respect to the axis of the elongate shaft 18.

The disc-shaped portion 36 of the cover 26 is formed with a radial slot 36a which terminates short of the periphery of the disc-shaped portion 36. A slide block 38 of inverted L-shape rests on the outer surface of the disc-shaped portion 36 and has a leg 38a which, passing through the radial slot 36a, is slidably fitted in the groove 32 of the grooved wheel 30 (see FIG. 4C). Thus, the slide block 38 is slidingly moved inwardly or outwardly along the guiding radial slot 36a when the grooved wheel 30 rotates in a certain direction. The slide block 38 is further formed with two ramps 38b and 38c for the purpose described hereinafter.

The part encircled by a dot-dash line P in FIG. 2 is a switch 40 mounted on the disc-shaped portion 36 of the cover 26. Specifically, the switch 40 consists of a movable element 40a and a fixed element 40b from which respective lead lines (no numerals) extend to form an electric circuit shown in FIG. 5. The switch 40 is so arranged that when the leg 38a of the sliding block 38 abuts against the outmost end of the radial slot 36a of the disc-shaped portion 36, the sliding block 38 at its ramp 38b engages the movable element 40a to bring it into contact with the fixed element 40b, thus closing the switch 40.

Figure 3:
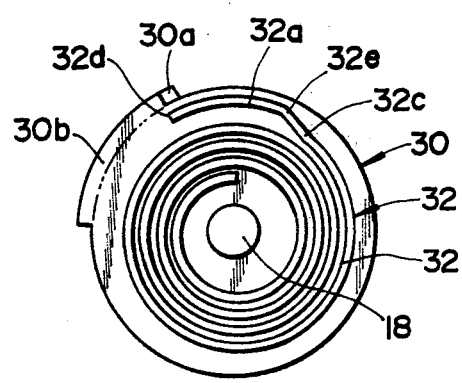
FIG. 3 is a front view of a grooved wheel used in the seat belt retractor of the present invention.

Details of the grooved disc 30 are depicted in FIG. 3. As shown, the groove 32 consists of a concentric arc section 32a of a certain length and a volute section 32b which convolves to the center area of the wheel 30. The arc section 32a is formed to be concentric with the axis of the wheel 30 and is stepwisely adjoined to the volute section 32b via a small linear section 32c. The grooved wheel 30 is further formed at a peripheral portion thereof adjacent the outer end of the groove 32 with a boss 30a which has a section extending laterally as viewed in FIG. 1, that is in the same direction as the end 18b of the elongate shaft 18 projects. For the reasons which will become apparent hereinafter, an arc-shaped projection 30b is formed on the periphery of the wheel 30 to extend from the boss 30a and terminate at a given position which will be described hereinafter. The arc-shaped projection 30b is so formed that the diameter of an imaginary circle which includes the curved top surface of the projection 30b is larger than that of an imaginary circle which includes the tops of the teeth 28a of the ratchet wheel 28.

As best seen in FIG. 2, a blocker element indicated by numeral 42 is generally of wing shape and is pivotally mounted on a fixed stud 44. One wing of the blocker element 42 has a pivotal pawl 46 which is engageable with the ratchet wheel 28, while the other wing provides a stop member made of a flat spring 47 which will be after described. The pivotal pawl 46 is biased toward the ratchet wheel 28 by means of a spring 48 which is disposed about the stud 44. Thus, the pawl 46, in mesh with the ratchet wheel 38, prevents rotation of the ratchet wheel 28 and thus rotation of the belt take up reel 16 in a clockwise direction in FIG. 2, that is in a direction to retract the belt 20, while permitting an intermittent rotary movement of the ratchet wheel 28 in a counter-clockwise direction.

Figure 4A:
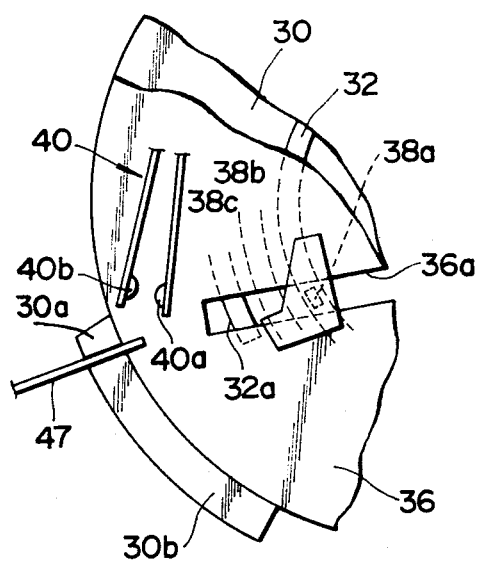
FIGS. 4A and 4B are enlarged views of a portion enclosed by a circle P of FIG. 2, showing operations of that portion.
Figure 4B:
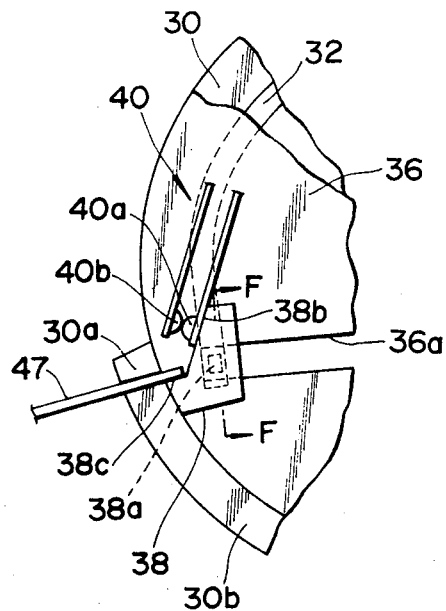
Figure 4C:
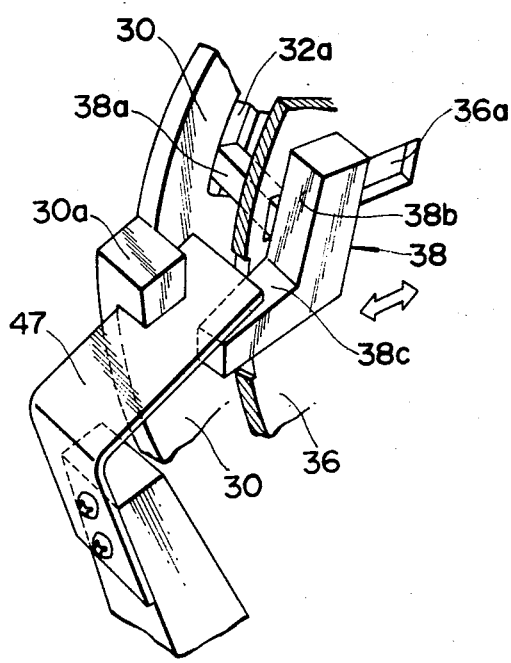
FIG. 4C is an enlarged perspective view of the portion enclosed by the circle P of FIG. 2.
Figure 4D:
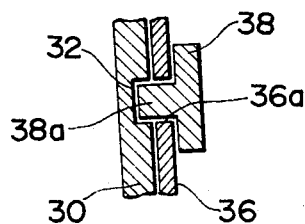
FIG. 4D is a sectional view taken along the line F—F of FIG. 4B.
Figure 6A:
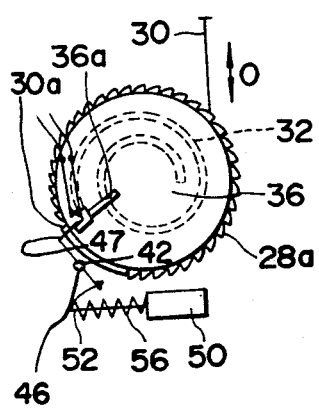
FIGS. 6A to 6D are illustrations depicting the operation of the seat belt retractor of the present invention.

Indicated by numeral 50 is a solenoid assembly having a plunger 52 reciprocally movable in dependence on energization and de-energization of the solenoid 50a. The plunger 52 has an actuator pin 54 laterally extending from the end of the plunger 52. The pin 54 is fitted in a recess 42b formed at the base portion 42a of the blocker element 42. The blocker element 44 is thus pivotally movable about the stud 44 in accordance with the reciprocal movement of the plunger 52. Specifically, when the solenoid 50a is energized, the plunger 52 is moved rightward in FIG. 2, that is, in a direction to rotate the blocker element 44 in a counterclockwise direction. A spring 56 is wound round the plunger 52 between the solenoid housing and the base portion 42a of the blocker element 42 to bias the blocker element 42 in a clockwise direction in FIG. 2, that is, in the direction to disengage the pawl 46 out of the ratchet wheel 28 as seen in FIG. 6A. In this condition, the flat spring 47 is put between the ramp 38c of the slide block 38 and the boss 30a of the grooved wheel 30 in their rest positions, as illustrated in FIGS. 4B and 4C.

Figure 5:
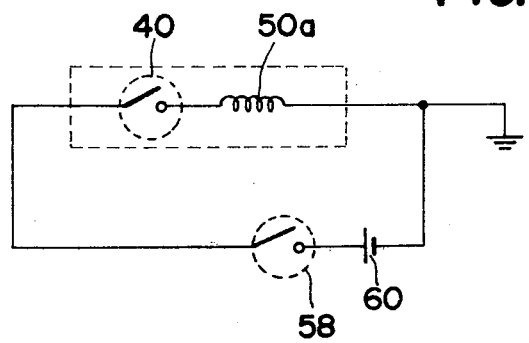
FIG. 5 is an electric circuit used for controlling the operation of the seat belt retractor of the invention.

Illustrated in FIG. 5 is an electric circuit in which the switch 40, the solenoid 50a of the solenoid assembly 50, a buckle switch 58 and a battery 60 are arranged in the illustrated manner. The buckle switch 58 is, for instance, mounted on a buckle (not shown) of the seat belt to close when the tongue (not shown) of the belt is engaged with the buckle, that is, when the seat belt assumes the occupant restraining position. It would be readily understood from FIG. 5 that the solenoid 50a is energized only when both the switches 40 and 58 take close positions.

Operation of the seat belt retractor mentioned above will be described in the following:

For easy understanding of this operation, the explanation of it will be commenced with respect to a condition wherein the buckle and the tongue of the seat belt 20 are just disengaged from each other for releasing the seat occupant. At this time, the buckle switch 58 assumes its open position permitting deenergization of the solenoid 50a. Thus, by the action of the spring 56, the plunger 52 is withdrawn from the solenoid housing thereby causing the blocker element 42 to be swung in a clockwise direction bringing the flat spring 47 near the periphery of the grooved wheel 30 and at the same time disengaging the pawl 46 of the blocker element 42 from the ratchet wheel 28. Thus, the ratchet wheel 28 and thus the belt take up reel 16 are rotated by the action of the return spring 22 in a direction to retract the belt 20 that is in a clockwise direction in FIG. 2. During this rotational movement of the ratchet wheel 28, the grooved wheel 30 which is in frictional contact with the ratchet wheel 28 rotates simultaneously in the same direction as the ratchet wheel 28. During the clockwise rotation of the grooved wheel 30, the lateral extension of the boss 30a of the grooved wheel 30 collides against the flat spring 47 of the blocker element 42 several times. (It should be noted that the resiliency of the flat spring 47 permits the uninterrupted rotation of the grooved wheel 30 past the flat spring 47.) Furthermore, during the clockwise rotation of the grooved wheel 30, the slide block 38 having the leg 38a slidably received in the groove 32 of the grooved wheel 30 is moved outwardly along the radial slot 36a formed in the end wall of the cover 26, and finally, the leg 38a reaches the concentric arc section 32a of the groove 32. When the leg 38a reaches the section 32a, the ramp 38c of the slide block 38 engages the supports the leading end of the flat spring 47 as is seen from FIG. 4C and at the same time, the other ramp 38b of the block 38 engages the switch movable element 48a to bring it contact with the switch fixed element 40b, thus closing the switch 40. When the leg 38a reaches the extreme end 32d of the groove 32 due to further rotation of the grooved wheel 30, the clockwise rotation of the wheel 30 stops. At this condition, the belt retracting by the take up reel 16 is made without rotation of the grooved wheel 30. It would be thus appreciated that when the seat belt is in unused condition, the mechanism for the seat belt retractor of the invention assumes the condition as schematically illustrated in FIG. 6A.

When the seat occupant intends to wear the seat belt 20, he or she withdraws the retracted seat belt 20. The withdrawal of the belt is made against the force of the return spring 22 by rotating the belt take up reel 16 in a counter-clockwise direction in FIG. 2. This rotation of the reel 16 brings about the simultaneous rotation of the grooved wheel 30 in the same direction as the wheel 16. However, the rotation of the grooved wheel 30 stops when the boss 30a of the wheel 30 is brought into contact with the upper side of the flat spring 47 in a manner as shown in FIG. 4C. (As will be understood from FIG. 4C, since the leading end of the flat spring 47 is supported by the ramp 38c in this condition, the flat spring 47 does not yield to the depression by the boss 30a thereby stopping the rotation of the grooved wheel 30 in the counter-clockwise direction. Further, it should be noted that grooved wheel 30 is kept stable with the arc-shaped projection 30b located close to the pawl 46 of the blocker element 42.) At this condition, the withdrawal of the belt 20 from the reel 16 is made without rotation of the grooved wheel 30.

Figure 6B:
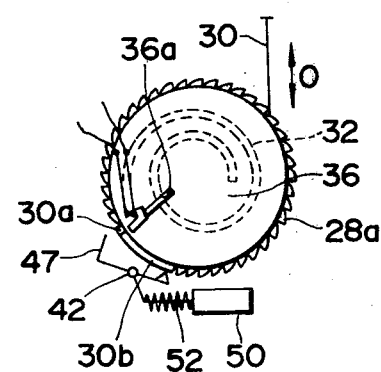

When the buckle and the tongue of the seat belt 20 are engaged, the buckle switch 58 closes thereby energizing the solenoid 50a of the solenoid assembly 50. (It should be noted that another switch 40 has been kept closed as is mentioned hereinafter.) Thus, the plunger 52 is moved rightward in FIG. 2 against the force of the spring 56 thereby pivotally moving the blocker element 42 in a counter-clockwise direction. With this action, the flat spring 47 is disengaged from both the ramp 38c of the slide block 38 and the boss 30a of the grooved wheel 30 and at the same time, the pawl 46 of the blocker element 42 moves toward the teeth 28a of the ratchet wheel 38. However, in this stage, the pawl 46 is prevented from meshingly engaging with the ratchet wheel 38 by the obstruction caused by the arc-shaped projection 30b formed on the grooved wheel 30. In fact, the pawl 46 is in contact with the top surface of the arc-shaped projection 30b as is schematically shown by FIG. 6B. Thus, upon releasing of the coupled unit of the buckle and the tongue from the wearer's hands, the seat belt 20 is retracted by the reel 16 by the action of the return spring 22 to such an extent that the belt wearer is tightly restrained by the belt 20 with a certain pressure exerted on the body of the belt wearer. (It should be noted that this action is made without clockwise rotation of the grooved wheel 30 since the leg 38a of the slide block 38 is kept in contact with the extreme end 32d of the groove 32. Thus, the disengagement of the pawl 46 relative to the ratchet wheel 28 is maintained.)

Figure 6C:
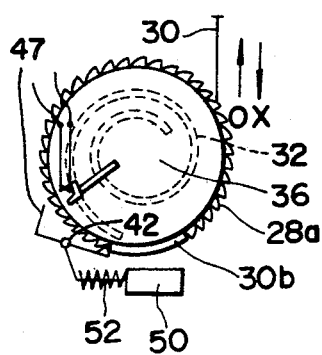
Figure 6D:
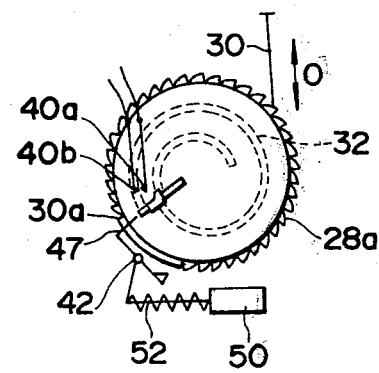

When, then, the belt 20 is withdrawn beyond a predetermined short length (which provides a slack to the belt at the memorizing position of the belt as will become clear hereinafter) by the belt wearer, the grooved wheel 30 rotates with the ratchet wheel 28 in a counter-clockwise direction permitting the pawl 46 to slide on and along the arc-shaped projection 30b of the grooved wheel 30, and when the grooved wheel 28 takes an angular position where the pawl 46 gets over the projection 30b, the pawl 46 is brought into engagement with one of the teeth 28a of the ratchet wheel 28 as is schematically shown by FIG. 6C. It should be noted that the angular position of the ratchet wheel 28 shown by FIG. 6C establishes a so-called "memorizing or memory" position. (As will become clear as the description proceeds, the seat belt retracting action of the retractor stops at this memorizing position.) Since the engagement of the pawl 46 with the teeth 28a of the ratchet wheel 28 permits the intermittent angular rotation of the ratchet wheel 28 in the counter-clockwise direction as has been mentioned before, further withdrawing of the seat belt 20 beyond the memorizing position is possible and during this withdrawing, the counter-clockwise rotation of the grooved wheel 30 continues. With this rotation of the grooved wheel 30, the leg 38a of the slide block 38 runs in and along the groove 32 in a direction to approach the center of the grooved wheel 30 moving the slide block 38 along the slot 36a radially inwardly of the disc-shaped portion 36 of the cover 26. When the leg 38a passes over the concentric arc section 32a of the groove 32, the switch opens. In this instance, the solenoid 50a of the solenoid assembly 50 becomes deenergized and thus the blocker element 42 is swung in the clockwise direction by the action of the spring 56 thereby disengaging the pawl 46 from the tooth 28a of the ratchet wheel 28 and simultaneously moving the flat spring 47 toward the grooved wheel 30, as is seen from FIG. 6D. Although the movement of the flat spring 47 induces collisions against the boss 30a of the grooved wheel 30, further rotation of the wheel 30 in the counter-clockwise direction induced by further withdrawing of the belt 20 is permitted since the flat spring 47 is no longer supported by the ramp 38c of the slide block 38.

When now the belt 20 is removed from the belt wearer's hands, the belt 20 is retracted by the action of the return spring 22 rotating the ratchet wheel 28 in the clockwise direction in FIG. 2. During this rotation of the ratchet wheel 28, the grooved wheel 30 also rotates in the same direction moving the slide block 38 radially outwardly of the disc-shaped portion 36 of the cover 26, and when the leg 38a of the slide block 38 reaches the joint section 32e (see FIG. 3) between the small linear section 32c and the concentric arc section 32a of the groove 32, the ramp 38b of the slide block 38 brings the switch movable element 40a into contact with the switch fixed element 40b to close the switch 40. Thus, the solenoid 50a of the solenoid assembly 50 becomes energized to cause the counter-clockwise movement of the blocker element 42 thereby stopping the rotation of the ratchet wheel 28 and thus the belt take up reel 16. It will be appreciated that the angular position of the ratchet wheel 28 now established is the before-mentioned memorizing position. At this time, the belt retracting action stops applying tension upon the belt wearer.

It should be noted that as long as the leg 38a of the slide block 38 is in the concentric arc section 32a of the groove 32, the switch 40 is kept closed and therefor the blocker element 42 is held in the ratchet wheel stopping position. That is, the belt corresponding in length to the arc section 32a of the groove 32 can be withdrawn without deactivating the blocker element 42. This withdrawable part of the belt 20, for instance of 10 mm to 20 mm, provides a comfort slack which alleviates the belt wearer's sensation of tension or restraint. Of course, further withdrawal of the belt 20 from the memorizing position is possible, repeating the operation as mentioned previously.

It would be apparent that if the belt wearer exerts an abrupt strong pressure onto the belt 20 as in vehicle collision, the emergency locking mechanism A immediately locks the withdrawal movement of the belt to prevent the body of the belt wearer from being violently thrown forward, for instance, against the instrument panel or windshield.

What is claimed is:

1. A seat belt retractor having a tension eliminator, comprising:
   a belt take up reel on which a seat belt is wound, said reel being biased to rotate in a direction to retract thereon said belt;
   a belt measuring wheel which is rotatable with said reel about the axis of said reel;
   slide means movable in response to the rotation of said belt measuring wheel;
   first signal producing means for producing a signal when said slide means takes a predetermined position;
   second signal producing means for producing a signal when said belt takes an operative position to restrain the seated occupant;
   blocker means having an operative position for preventing rotation of said reel in the direction to retract said belt in response to receiving both the signals produced by said first and second signal producing means, and an inoperative position allowing free rotation of said reel;
   stopping means for stopping the rotation of said belt measuring wheel in the same direction as that of said reel to withdraw the belt when said slide means takes said predetermined position and said blocker means takes said inoperative position; and
   obstruction means for preventing said blocker means from taking said operative position when said belt measuring wheel is in a predetermined angular range.

2. A seat belt retractor as claimed in claim 1, in which said belt measuring wheel has at its outer surface a groove consisting of an arc section of a predetermined length and a volute section stepwise adjoined to the arc section and convolving to the center of said wheel, and in which said slide means comprises a base portion movable relative to a stationary member of said seat belt retractor and a leg portion slidably movably received in said groove of said belt measuring wheel.

3. A seat belt retractor as claimed in claim 2, in which said first signal producing means is a switch which is arranged to close when said leg portion of said slide means is positioned in said arc section of said groove.

4. A seat belt retractor as claimed in claim 2, in which said blocker means comprises:
   a ratchet wheel rotated with said belt take up reel;
   a pivotally movable pawl element engageable with the teeth of said ratchet wheel for preventing rotation thereof in the belt retracting direction while permitting intermittent rotation of said ratchet wheel in the opposite direction;
   a solenoid assembly connected to said first and second signal producing means and allowing said pivotally movable pawl element to engage with said ratchet wheel when energized in response to receiving both the signals produced by said first and second signal producing means; and
   biasing means for allowing said pivotally movable pawl to be disengaged from said ratchet wheel when said solenoid assembly is deenergized.

5. A seat belt retractor as claimed in claim 4, in which said stopping means comprises:
   a boss formed on a peripheral portion of said belt measuring wheel;
   a resiliently deformable member attached to said pivotally movable pawl element and having a leading end engageable with said boss upon rotation of said belt measuring wheel; and
   a ramp formed on said base portion of said slide means, said ramp being capable of supporting the leading end of said resiliently deformable member thereby suppressing the rotation of said belt measuring wheel in the belt withdrawing direction when said slide means takes said predetermined position and said solenoid assembly is deenergized.

6. A seat belt retractor as claimed in claim 5, in which said obstruction means comprises an arc-shaped projection formed on the peripheral portion of said belt measuring wheel, said arc-shaped projection being sized to contact with said pivotally movable pawl element when said belt measuring wheel is in the predetermined angular range.

7. A seat belt retractor as claimed in claim 6, in which said arc-shaped projection extends from said boss.

8. A seat belt retractor as claimed in claim 7, in which said arc-shaped projection is so formed that the diameter of an imaginary circle which includes the curved top surface of said arc-shaped projection is larger than that of an imaginary circle which includes the tops of the teeth of said ratchet wheel.

9. A seat belt retractor as claimed in claim 1, further comprising emergency locking mechanism which is associated with said belt take up reel to lock the reel thereby stopping feeding of the belt from the reel when subjected to violent shock applied to said belt.

* * * * *